United States Patent [19]

Tsuboi

[11] Patent Number: 4,463,823
[45] Date of Patent: Aug. 7, 1984

[54] POWER TRANSMISSION UNIT FOR A MOTORCYCLE

[75] Inventor: Masaharu Tsuboi, Sayama, Japan

[73] Assignee: Honda Giken Kogyo Kabushiki Kaisha, Tokyo, Japan

[21] Appl. No.: 364,460

[22] Filed: Apr. 1, 1982

[30] Foreign Application Priority Data

Apr. 2, 1981 [JP] Japan .................................. 56-49843
Apr. 6, 1981 [JP] Japan .................................. 56-51511

[51] Int. Cl.³ .......................................... B62M 11/10
[52] U.S. Cl. .................................. 180/226; 74/606 R; 180/230
[58] Field of Search .................. 180/226, 230; 74/219, 74/606 R

[56] References Cited

U.S. PATENT DOCUMENTS 4,309,915  1/1982  Nozawa et al. .................... 74/606 R
4,373,601  2/1983  Onda et al. ......................... 180/230

Primary Examiner—John A. Pekar
Assistant Examiner—D. Lynn Fugate
Attorney, Agent, or Firm—Armstrong, Nikaido, Marmelstein & Kubovcik

[57] ABSTRACT

A power transmission unit for a motorcycle is disclosed which includes a power unit case consisting of a crankcase and a transmission case both of which are integrally formed with one another. A bevel gear case incorporating therein a bevel gear assembly is detachably secured to the power unit case at a recessed section of the latter. The recessed section is located rearwardly of a generator which is disposed at the outermost part of the power unit case. The bevel gear assembly comprises a driving bevel gear connected with a countershaft in the power unit case, and a driven bevel gear connected with a final shaft which is in turn connected to a rear wheel. Both the driving and driven bevel gears are rotatably supported in the bevel gear case by means of bearings received in bearing holders which are detachably secured to the bevel gear case by means of tightening bolts, whereby the bevel gear case is mounted on or dismounted from the power unit case with the driving and driven gears incorporated in the bevel gear case.

4 Claims, 6 Drawing Figures

POWER TRANSMISSION UNIT FOR A MOTORCYCLE

BACKGROUND OF THE INVENTION

1. Field of the Invention

The present invention relates to a power transmission unit for a motorcycle by way of which power generated by an engine is transmitted via a countershaft in a transmission mechanism to a final shaft which is in operative connection with a rear wheel.

2. Description of the Prior Art

It is hitherto known with a conventional shaft drive power transmission system for a motorcycle that a countershaft in a transmission mechanism is operatively connected to a propeller shaft for a rear wheel via a bevel gear transmission mechanism. However, due to the arrangement of the conventional bevel gear transmission mechanism on the side wall of the transmission case, the motorcycle tends to be equipped with a power transmission unit which has an increased width in the transversal direction, resulting in a considerable limitation in designing a bank angle for the motorcycle.

SUMMARY OF THE INVENTION

In view of the drawbacks with the conventional power transmission unit as described above, the present invention is intended to construct the above-mentioned kind of power transmission unit including a bevel gear assembly without any possibility of dimensioning an increased transversal width.

The present invention consists in that the improved power transmission unit essentially comprises a power unit case and a bevel gear case, the former consisting of a crankcase and a transmission case both of which are integrated one with another, while the latter including a bevel gear assembly which consists of two bevel gears, one of them being a driving bevel gear which is in operative connection with a countershaft in the transmission case and the other one being a driven bevel gear which is in operative connection with a final shaft by which a rear wheel is driven, said driving and driven bevel gears meshing with one another. The bevel gear case is fixedly mounted to the one side wall of the power unit case at a recessed section of the latter, said recessed section being located inward of a generator which is arranged at the outermost part of the power unit case.

Thus, it is an object of the present invention to provide an improved power transmission unit for a motorcycle without any necessity for an enlarged transversal width of a motorcycle.

It is other object of the present invention to provide a power transmission unit in which both the driving and driven bevel gear are easily assembled and disassembled in the bevel gear case.

It is another object of the present invention to provide a power transmission unit in which the whole power transmission system is easily mounted and dismounted on the motorcycle.

It is a further object of the present invention to provide a power transmission unit which is easy to be maintained, inspected, repaired or the like.

It is a still further object of the present invention to provide a power transmission unit which is manufactured without any increase in manufacturing cost in comparision with the conventional one.

Other objects and advantagous features of the present invention will be readily apparent from the reading of the following detailed description of a few preferred embodiments of the invention made in connection with the accompanying drawings.

BRIEF DESCRIPTION OF THE ACCOMPANYING DRAWINGS

Now the present invention will be described in more details with reference to the accompanying drawings in which;

FIGS. 1 to 4 illustrate a power transmission unit in accordance with the first embodiment of the present invention, wherein FIG. 1 is a side view of a motorcycle with the power transmission unit of the invention mounted thereon; FIG. 2 is a plan view of the motorcycle in FIG. 1; FIG. 3 is a horizontal sectional view of the power transmission unit, taken in line III—III in FIG. 1 and FIG. 4 is a side view of the power transmission unit as seen from the line III—III in FIG. 1;

FIG. 5 is a horizontal sectional view of the power transmission unit in accordance with the second embodiment of the present invention, sectioned in the same manner as FIG. 3; and FIG. 6 is another horizontal sectional view of the power transmission unit in accordance with the third embodiment of the present invention, sectioned in the same manner as FIG. 3.

DESCRIPTION OF PREFERRED EMBODIMENTS

Figure 1:
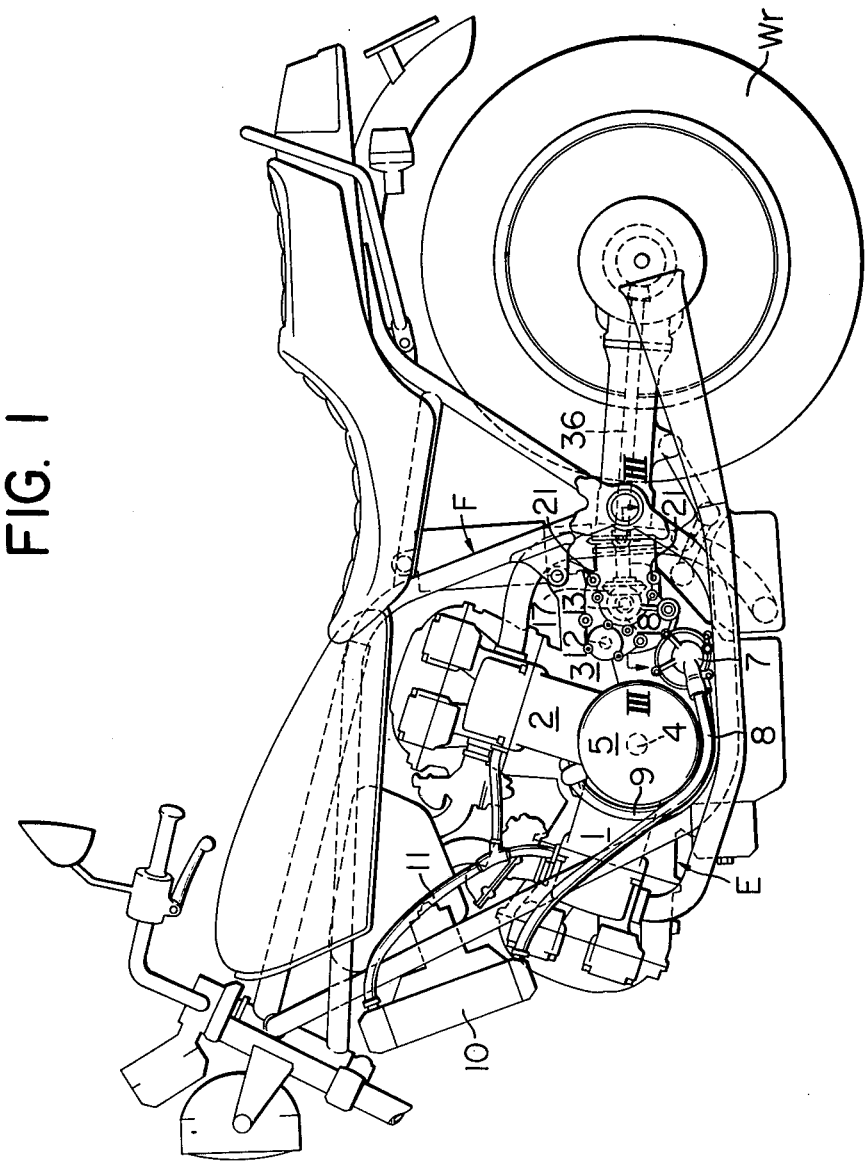
Figure 2:
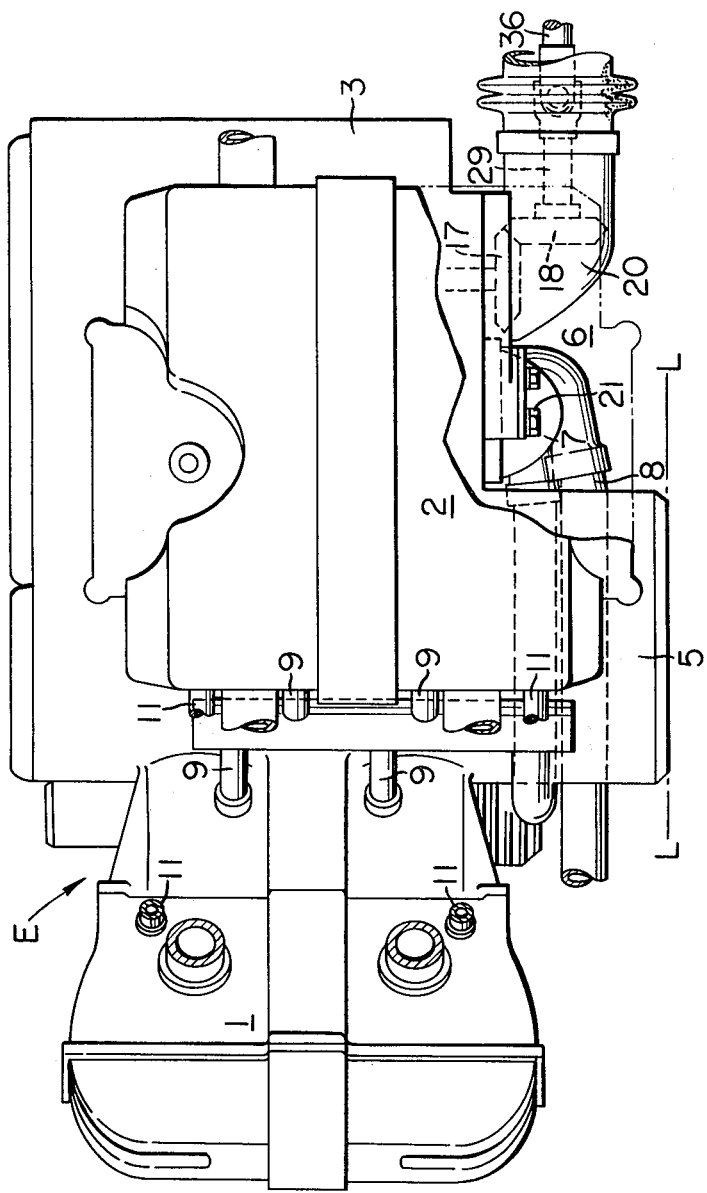

In the following description and the accompanying drawings, the same or corresponding parts are identified by the same reference numerals.

First, the first embodiment of the present invention will be described in a greater detail with reference to FIGS. 1 to 4.

As is apparent from FIG. 1, a V-shaped multi-cylinder engine E is firmly mounted on a double cradle type body frame F in a transversal direction (i.e. in such a direction that a crankshaft 4 on the engine E extends at a right angle relative to the longitudinal direction of the body frame F), whereas the engine body is constructed of two engine blocks 1 and 2 disposed in a V-shaped configuration as seen from the side and a power unit case 3 located below said engine blocks 1 and 2, said power unit case 3 including a crank case and a transmission case both of which are integrated one with another.

A generator 5 adapted to be driven by the crankshaft 4 is located at the forward part of the one side wall of the power unit case 3. Behind the generator 5 on the one side wall of the power unit case 3 is provided a recessed section as generally identified by reference numeral 6, said recessed section being located inward of the generator 5. Further, a coolant pump 7 adapted to be driven by the crankshaft 4 is disposed on the one side wall of the power unit case 3 in the recessed section 6. The coolant pump 7 includes a suction port and a discharge port, said suction port being connected to a suction pipe 8, while said discharge port being connected to a discharge pipe 9. Specifically, the suction pipe 8 extends around the lower part of the periphery of the generator 5 and further extends forward along the down-tube of the body frame F until it reaches an outlet port of a radiator 10 at its upper end, whereas the discharge pipe 9 extends also around the lower part of the periphery of the generator 5 until it reaches an inlet port of a coolant passage for the engine blocks 1 and 2. Between the outlet port of the coolant passage in the engine blocks 1 and 2 and the inlet port of the radiator 10 is provided a coolant conducting pipe 11 through which a communication is ensured therebetween. Said coolant conducting pipe 11 extends substantially along the downtube of the body frame F.

As the engine E is operated and the coolant pump 7 is driven thereby, cooling water circulates forcibly from the coolant pump 7 through the coolant passage in the engine blocks 1 and 2 and the radiator 10 whereby the engine blocks 1 and 2 are cooled in the conventional manner.

A main shaft 12 operatively connected to the crankshaft and a countershaft 13 operatively connected to said main shaft 12 via a speed change gearing mechanism 14 are provided in the power unit case 3, said main shaft 12 and said countershaft 13 being rotatably arranged in parallel to one another so that they are in operative connection via the speed change gearing mechanism 14 in such a manner that rotation of the main shaft 12 is transmitted to the countershaft 13 at a certain speed reduction ratio which is determined by shifting operation of the speed change gearing mechanism 14.

Figure 3:
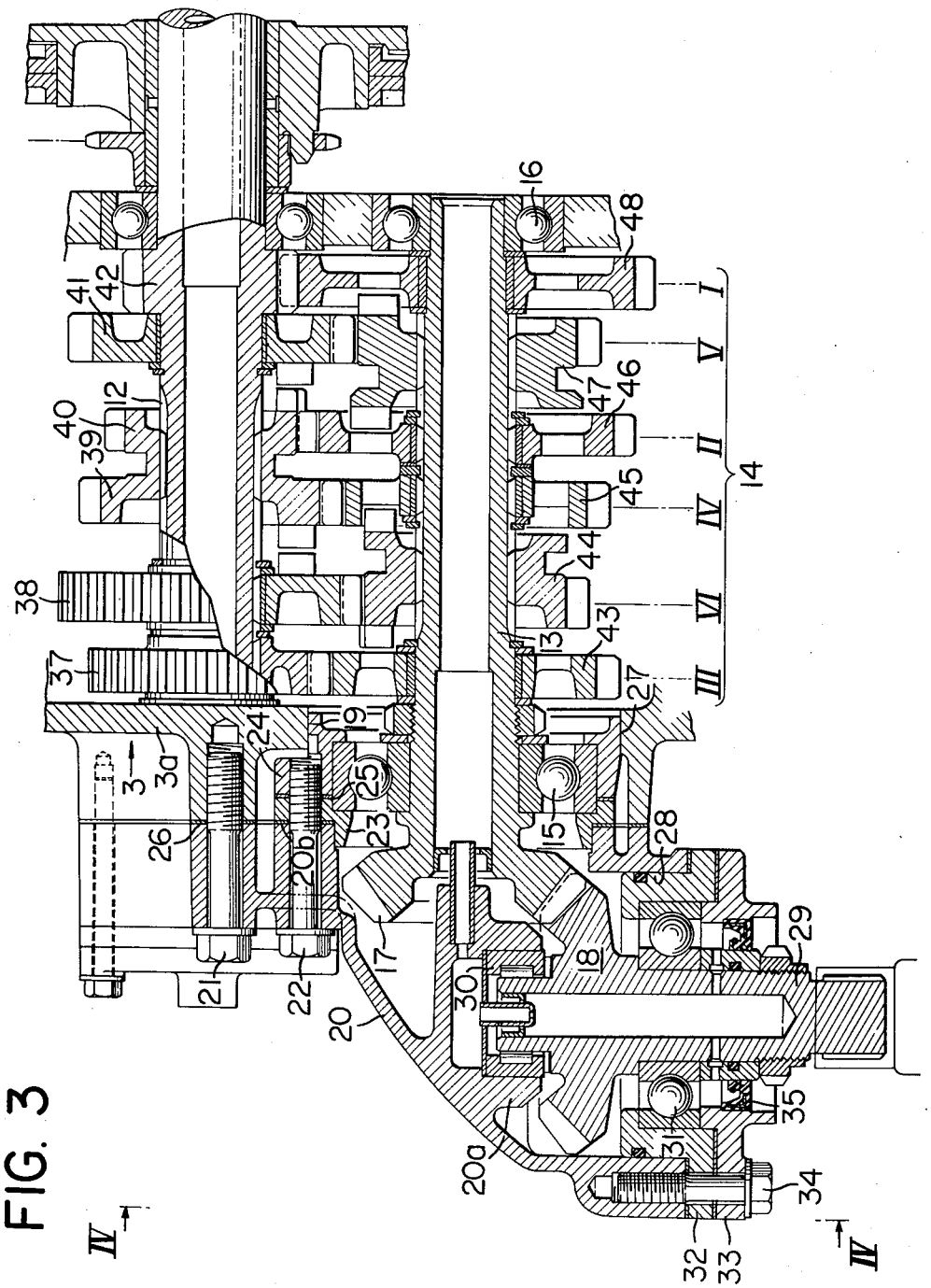
Figure 4:
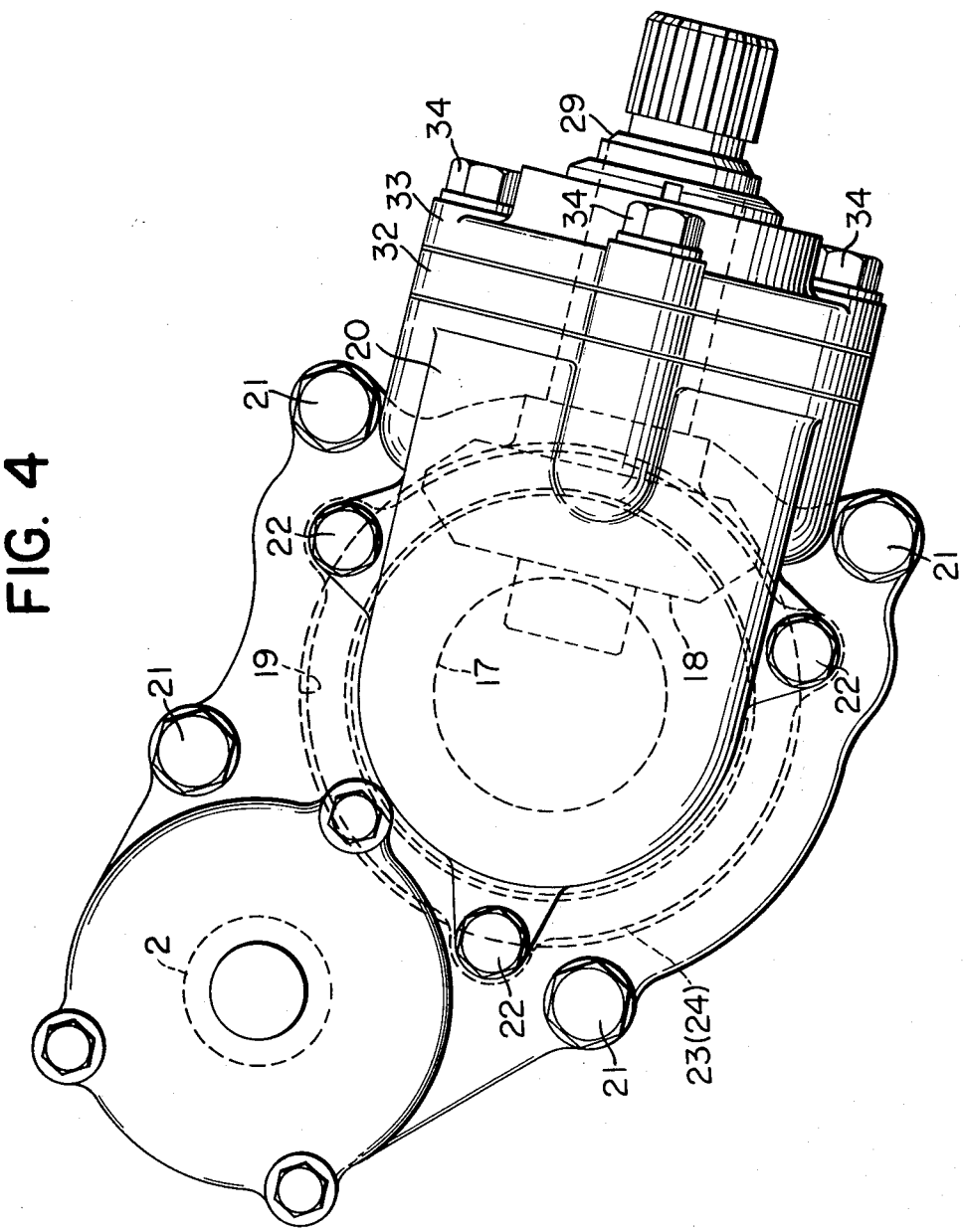

As is seen from FIG. 3, the countershaft 13 is rotatably supported in the power unit case 3 by means of ball bearings 15 and 16 and it includes a driving bevel gear 17 which is integrally formed at the left end part thereof. Said bevel gear 17 is projected outward of the bearing receiving bore 19 in the outer wall $3_a$ of the power unit case 3 as if it is carried in a cantilever fashion by means of the ball bearing 15. A bevel gear case or final gear case 20 is fixedly secured to the outer wall $3_a$ of the power unit case 3 by means of a plurality of tightening bolts 21 so that the bearing receiving bore 19 is covered or shielded. It should be noted that said bevel gear case 20 is located in the recessed section 6 such that the outermost part thereof is positioned inward of a line L—L extending along the outer wall of the generator 5. Specifically, the bevel gear case 20 is secured to the power unit case 3 at the abutment face $20_b$ with the first and second bearing holders 23 and 24 and a gasket 25 disposed therebetween, said gasket 25 being located intermediate both the bearing holders 23 and 24 so as to prevent any occurrence of leakage of lubricant therefrom. The bearing holders 23 and 24 are firmly connected to the bevel gear case 20 by means of a plurality of tightening bolts 22 which are screwed into corresponding threaded holes in the bearing holders from the outside of the bevel gear case 20, whereas a shim plate 26 is located intermediate the bevel gear case 20 and the first bearing holder 23 to be tightly clamped therebetween. The ball bearing 15, of which inner race is previously press fitted on the counter shaft 13, includes an outer race which is received in both the bearing holders 23 and 24. The second bearing holder 24 is formed with a cylindrical fitting surface 27 at the right part thereof so that the latter is slidably fitted in the bearing receiving bore 19 in the power unit case 3. Owing to the arrangement as mentioned above, the driving bevel gear 17 can be incorporated in the bevel gear case 20 with the aid of the bearing holders 23 and 24. When the tightening bolts 21 are loosened and removed, the bevel gear case 20 can be disconnected from the power unit case 3 together with the first and second bearing holders 23 and 24, the driving bevel gear 17 and the counter shaft 13.

The bevel gear case 20 has a power delivery bore 28 which is opened at the lower end wall thereof, as seen in FIG. 3, so that a final shaft 29 is inserted into the bevel gear case 20 through said power delivery bore 28. Said final shaft 29 is rotatably supported in the bevel gear case 20 with the aid of a needle bearing 30 and a ball bearing 31. Said needle bearing 30 is fitted into a bearing holder portion $20_a$ integrally projected from the final gear case 20, whereas said ball bearing 31 is fitted into a bearing holder 32 which is fixedly secured at the power delivery bore 28 to the bevel gear case 20 together with a case cover 33 by means of a plurality of tightening bolts 34. The final shaft 29 includes a driven bevel gear 18 integrally formed at the innermost end thereof, said driven bevel gear 18 meshing with the driving bevel gear 17 in the bevel gear case 20 so that rotational power is transmitted from the countershaft 13 to the final shaft 29. An oil seal 35 is fitted into the space as defined between the power delivery bore 28 in the final gear case 20 and the final shaft 29 so that no lubricant leakage takes place therethrough. Further, the final shaft 29 is operatively connected with a rear wheel Wr through a propeller shaft 36 so as to drive the rear wheel Wr.

It should be noted that the speed change gearing mechanism 14 comprises I to VI stage speed change gear lines. Now referring to FIG. 3, the main shaft 12 carries III speed stage driving gear 37, VI speed stage driving gear 38, IV speed stage driving gear 39, II speed stage driving gear 40, V speed stage driving gear 41 and I speed stage driving gear 42 in accordance with the order as seen from the left in the drawing, whereas the countershaft 13 has III speed stage driven gear 43, VI speed stage driven gear 44, IV speed stage driven gear 45, II speed stage driven gear 46, V speed stage driven gear 47 and I speed stage driven gear 48 in accordance with the order as seen from the left in the drawing, said driving gears 37 to 42 meshing with the corresponding driven gears 43 to 48.

Since the III speed stage driven gear 43, the VI speed stage driven gear 44 and the IV speed stage driven gear 45 located on the left half of the countershaft 13 (see FIG. 3) are dimensioned smaller than the inner diameter of the bearing receiving bore 19 in the power unit case 3 respectively, it is possible that the respective driven gears 43, 44 and 45 are inserted in or removed from the power unit case 3 through the bearing receiving bore 19 as they are carried on the countershaft 13.

Now operation of the power transmission unit in accordance with the first embodiment of the present invention will be described below.

When the engine is operated, the main shaft 12 is driven thereby and the rotation of the main shaft 12 is transmitted to the countershaft 13 via the speed change gearing mechanism 14. Further, the rotation of the countershaft 13 is transmitted to the final shaft 29 via a bevel gear assembly comprising the driving bevel gear 17 on the countershaft 13 and the driven bevel gear 18 on the final shaft 29.

Since the power transmission unit of the present invention is constructed in the above-described manner, it is possible to secure the bevel gear case 20 to the power unit case 3 from the outside by means of the tightening bolts 21 with the driving bevel gear 17 and the driven bevel gear 18 being preassembled in position on the bevel gear case 20. Provided that there is caused a necessity for maintenance operation such as cleaning, repairing or the like in the bevel gear case 20, the case mounting bolts 21 and the bearing mounting bolts 22 are loosened and removed and thereby the bevel gear case 20 is disconnected from the power unit case 3 with the driving bevel gear 17 being held on the power unit case 3, whereby maintenance work is easily conducted for the bevel gear case 20.

Figure 5:
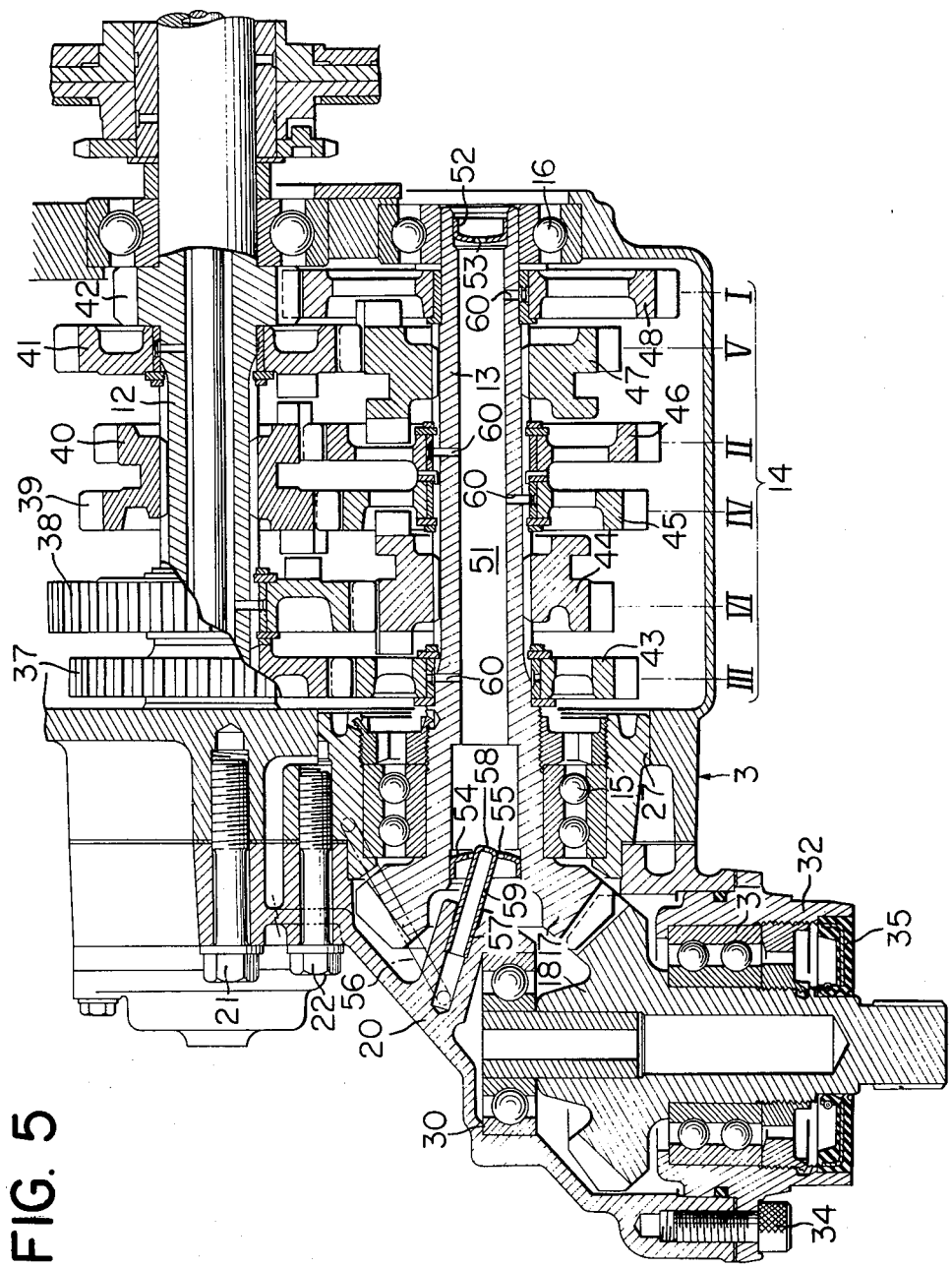

Next, FIG. 5 illustrates a power transmission unit in accordance with the second embodiment of the present invention.

In this embodiment the countershaft 13 has a lubricant passage 51 extending throughout the whole length thereof, said lubricant passage 51 being fitted with a cap 52 with a small hole 53 provided thereon at the end remote from the driving bevel gear 17, while it being fitted with another cap 54 with a lubricant feed hole 55 provided thereon at the end adjacent to the driving bevel gear 17.

The bevel gear case 20 includes a lubricant feed passage 56 which is communicated with a lubricant pump (not shown), said lubricant feed passage 56 being fitted with a lubricant discharge tube 57 at the open end in the bevel gear case 20 in such a manner that the open end part of said lubricant discharge tube 57 is firmly inserted into the open end part of the lubricant feed passage 56. The closed end part of the lubricant discharge tube 57 extends through the lubricant feed hole 55 in the cap 54 to be exposed to the lubricant passage 51. The lubricant discharge tube 57 has the first lubricant discharge port 58 drilled at the closed end thereof, whereas it has the second lubricant discharge port 59 drilled at the middle part thereof in such a direction that lubricant is supplied to the meshing area of both the driving and driven bevel gears 17 and 18 therethrough.

Since the power transmission unit in accordance with this embodiment of the invention is constructed in the above-described manner, it is ensured that the lubricant discharge tube 57 in the lubricant feed passage 56 is brought in communication with the lubricant passage 51 in the countershaft 13 merely by mounting the bevel gear case 20 onto the power unit case 3, whereby a lubricant feed system is provided for the speed change gearing mechanism 14.

As is apparent from FIG. 5, the countershaft 13 includes a plurality of radially extending lubricant holes 60 located in an axially spaced relation through which lubricant is supplied to the sliding parts as well as the meshing parts on the group of gears in the speed change gearing mechanism 14.

Now operation of the power transmission unit in accordance with this embodiment of the invention will be described below.

As the engine is operated and the lubricant pump is driven thereby, a part of pressurized lubricant is delivered from the lubricant pump to the lubricant passage 51 by way of the lubricant feed passage 56, the lubricant discharge tube 57 and the first lubricant discharge port 58. Further, it is delivered from the lubricant passage 51 to the driven gears 43 to 48 by way of the lubricant holes 60 so that the intended lubrication is achieved for the sliding and meshing parts on the driven gears. Lubricant required for the group of driving gears 37 to 42 is supplied from the driven gears 43 to 48 by way of their meshing operation.

Another part of pressurized lubricant supplied into the lubricant discharge tube 57 is delivered to the driving bevel gear 17 and the driven bevel gear 18 of the bevel gear power transmission mechanism through the second lubricant discharge port 59, particularly to their meshing parts so that effective lubrication is achieved at the meshing parts.

As described above, the power transmission unit in accordance with this embodiment of the invention is constructed merely by mounting the bevel gear case 20 onto the power unit case 3 so that a single lubricant feed system is ensured for the purpose of forcibly lubricating the speed change gearing mechanism as well as the bevel gear power transmission mechanism. Particularly, the bevel gear power transmission mechanism is well lubricated by direct injection of pressurized lubricant toward the meshing parts whereby excellent and effective lubrication is achieved therefor.

It should be noted that structure and function of the second embodiment other than the foregoing are substantially same to those in the first embodiment of the invention as illustrated in FIGS. 1 to 4. Thus, repeated description will be neglected for the sake of simplification.

Figure 6:
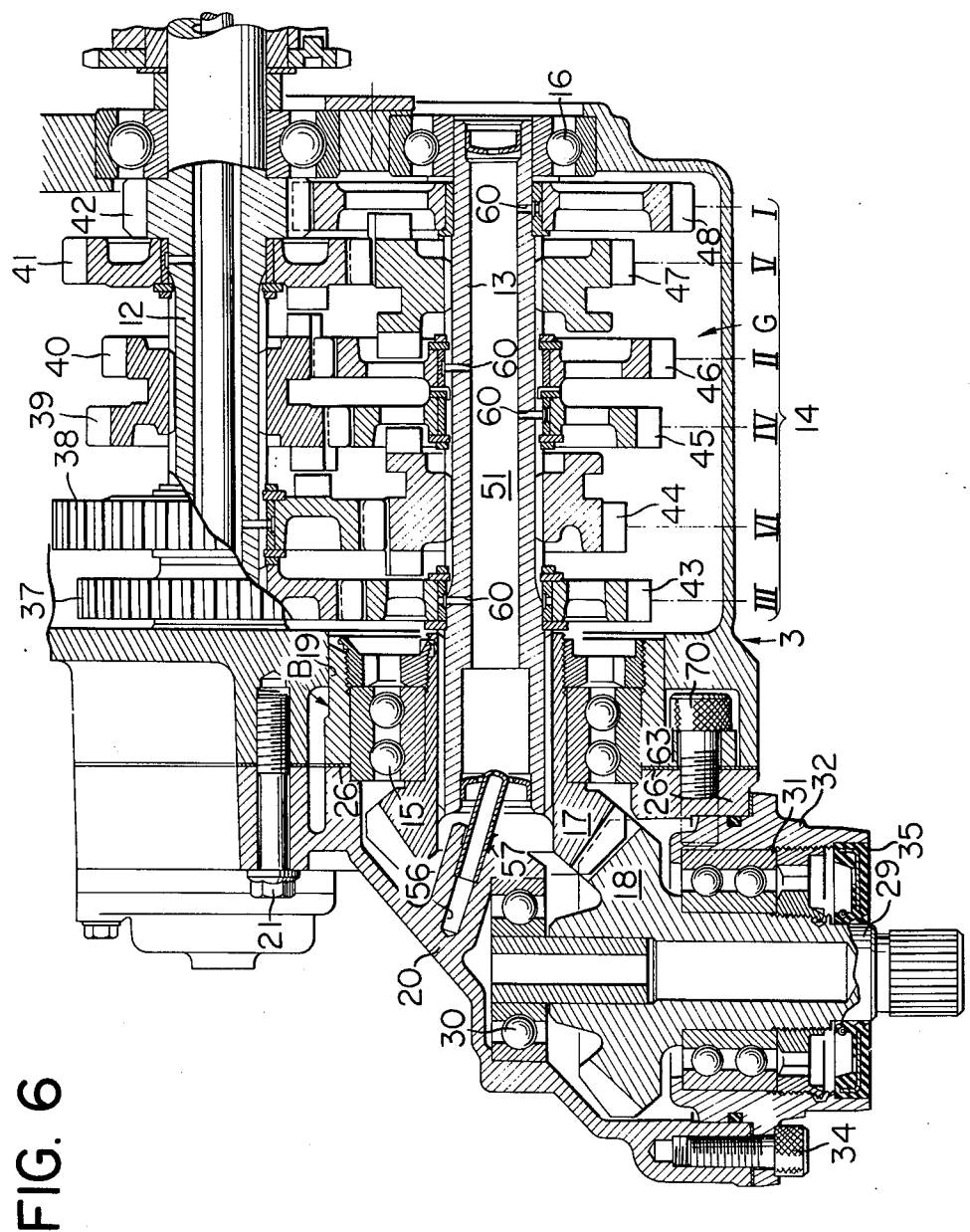

Next, FIG. 6 illustrates a power transmission unit in accordance with the third embodiment of the present invention.

In this embodiment the countershaft 13 is rotatably supported such that the one end thereof (right end as seen in the drawing) is journalled by means of a ball bearing 16 in the power unit case 3, while the other end thereof (left end as seen in the drawing) is journalled by means of a bearing assembly, as identified by reference letter B, which includes a driving bevel gear 17 spline fitted on the countershaft 13. Specifically, the bearing assembly B comprises an annular bearing holder 63 slidably fitted into the bearing receiving bore 19 in the power unit case 3 and a double row ball bearing 15 fitted into said annular bearing holder 63. The driving bevel gear 17 is tightly fitted into said ball bearing 15. Thus, the driving bevel gear 17 can be disconnected from the countershaft 13 together with the bearing holder 63.

The bearing assembly B is firmly connected to the bevel gear case 20 by means of a plurality of tightening bolts 70. The driving bevel gear 17 is spline fitted onto the countershaft 13 with both the driving bevel gear 17 and the driven bevel gear 18 incorporated in the bevel gear case 20, and then the bevel gear case 20 is mounted onto the power unit case 3 by means of a plurality of tightening bolts 21. On the contrary, the bevel gear case 20 is disconnected from the power unit case 3 with the driving and driven bevel gears 17 and 18 incorporated in the bevel gear case 20, when the tightening bolts 21 are loosened and removed and then the driving bevel gear 17 is disengaged from the countershaft 13.

Since the power transmission unit in accordance with this embodiment of the invention is constructed in the above-described manner, it is possible to effect subassembling for a group of gears in the speed change gearing mechanism 14 with the driving bevel gear 17 removed from the countershaft 13. As a result assembling and disassembling of the whole power transmission unit are performed without any particular difficulty and in addition, maintenance operation such as fine adjustment of gear meshing for the driving and driven bevel gears 17 and 18 or the like is also easily performed.

Another advantageous feature of this embodiment of the invention consists in that the countershaft 13 is designed in a straight line whereby it is easily machined and thereby it is manufactured at a reduced cost.

It should be noted that structure and function of the power transmission unit in accordance with this embodiment of the invention other than the foregoing are substantially same to those in the second embodiment as illustrated in FIG. 5. Thus, repeated description will not be required.

As described above, the power transmission unit in accordance with the invention is constructed such that a generator is disposed on the one side wall of a power unit case comprising a crank case and a transmission case both of which are integrated one with another, and a recessed section is provided rearward of the generator on the same side wall of the power unit case so that a power transmission case is located in the recessed section in which a bevel gear power transmission assembly is incorporated for operatively connecting the countershaft in the power unit case to a final shaft which is adapted to rotate a rear wheel. Thus, it is ensured that the power unit case has no increased width in spite of the mounting of the bevel gear power transmission assembly and that a sufficiently wide bank angle is provided for a motorcycle.

Further, the power transmission unit of the invention is constructed such that a driving bevel gear is disposed directly on the countershaft. Thus, it is ensured that the power transmission mechanism is designed in a double shaft fashion where a main shaft and a countershaft are extended in parallel to one another in the transversal direction across the power unit case whereby a longitudinal dimension of the power unit case is substantially reduced.

Furthermore, the power transmission unit of the invention is constructed such that bearing holders are removably secured to the bevel gear case so that both the driving and driven bevel gears are rotatably supported in the bevel gear case with the aid of bearing means fitted into the bearing holders. Thus, it is ensured that a bevel gear power transmission assembly with both the driving and driven bevel gears previously incorporated therein is mounted to the outside wall of the power unit case whereby assembling or disassembling of the driving and driven bevel gears in the bevel gear case is easily performed and moreover the bevel gear power transmission assembly is also easily mounted onto the power unit case. As a result assembly work is conducted at a substantially increased efficiency for the whole power transmission system of a motorcycle, ensuring an excellent dimentional accuracy in the power transmission system between the countershaft and the final shaft.

What is claimed is:

1. A power transmission unit for a motorcycle having a body frame, the transmission unit comprising: a power unit case consisting of a crankcase and a transmission case for an engine mounted on the body frame, said crackcase and transmission case being integrated one with another; a bevel gear assembly; a countershaft in said transmission case; and a final shaft adapted to drive a rear wheel; said power unit case including a bevel gear case accommodating therein said bevel gear assembly, said bevel gear assembly including a driving bevel gear which is operatively connected with said countershaft in said transmission case, a driven bevel gear meshing with said driving bevel gear and operatively connected with said final shaft, and bearing means fitted in bearing holders which are fixedly secured to said bevel gear case by means of tightening bolts, said bearing means rotatably supporting said driving and driven bevel gears in said bevel gear case, said driving bevel gear being splined fitted onto said countershaft as it is rotatably supported by said bearing means in the bearing holder therefor, whereby the bevel gear assembly is mounted on and can be dismounted from the power unit case with both the driving and driven bevel gears incorporated in the bevel gear assembly.

2. A power transmission unit as defined in claim 1, wherein the bearing holder for said driving bevel gear is slidably fitted into a bearing holder receiving bore in said power unit case as it is fixedly secured to said bevel gear case by tightening bolts which are screwed into threaded holes on said bevel gear case from the inside.

3. A power transmission unit for a motorcycle having a body frame, the transmission unit comprising: a power unit case consisting of a crankcase and a transmission case for an engine mounted on the body frame, said crankcase and said transmission case being integrated one with another; a bevel gear assembly; a countershaft in said transmission case; and a final shaft adapted to drive a rear wheel; said power unit case including a bevel gear case accommodating therein said bevel gear assembly, said bevel gear assembly including a driving bevel gear integrally formed at one end of said countershaft, a driven bevel gear meshing with said driving bevel gear and spline connected to said final shaft, and bearing means fitted in bearing holders which are fixedly secured to said bevel gear case by means of tightening bolts, said bearing means rotatably supporting said driving and driven bevel gears in said bevel gear case, whereby the bevel gear assembly is mounted on and and can be dismounted from the power unit case with both the driving and driven bevel gears incorporated in the bevel gear assembly.

4. A power transmission unit as defined in claim 3, wherein said bearing means for said driving bevel gear is slidably fitted into a bearing holder receiving bore in said power unit case as it is fixedly secured to said bevel gear case by means of tightening bolts which are screwed into threaded holes on said bearing holder from the outside.

* * * * *